(12) United States Patent
Hayashida

(10) Patent No.: US 8,943,703 B2
(45) Date of Patent: Feb. 3, 2015

(54) DIGITAL INDICATOR AND MULTIPOINT MEASURING APPARATUS

(71) Applicant: Mitutoyo Corporation, Kawasaki-shi, Kanagawa (JP)

(72) Inventor: Shuji Hayashida, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 200 days.

(21) Appl. No.: 13/785,344

(22) Filed: Mar. 5, 2013

(65) Prior Publication Data

US 2013/0247403 A1    Sep. 26, 2013

(30) Foreign Application Priority Data

Mar. 26, 2012   (JP) ................... 2012-069379

(51) Int. Cl.
*G01B 3/22* (2006.01)
*G01D 7/00* (2006.01)
*G01B 5/207* (2006.01)

(52) U.S. Cl.
CPC .. *G01D 7/00* (2013.01); *G01B 3/22* (2013.01); *G01B 5/207* (2013.01)
USPC ............................................. 33/505; 33/784

(58) Field of Classification Search
CPC ............. G01B 3/22; G01B 5/207; G01D 7/00
USPC .................... 33/501, 505, 784, 832
See application file for complete search history.

(56) References Cited

U.S. PATENT DOCUMENTS

| | | | |
|---|---|---|---|
| 5,072,174 A | 12/1991 | Weber | |
| 5,979,069 A * | 11/1999 | Hayashida et al. | 33/832 |
| 6,412,187 B1* | 7/2002 | Sasaki et al. | 33/784 |
| 2009/0113734 A1* | 5/2009 | Matsumiya et al. | 33/505 |
| 2013/0047698 A1* | 2/2013 | Biddle | 73/1.89 |
| 2013/0067760 A1* | 3/2013 | Husted | 33/784 |

FOREIGN PATENT DOCUMENTS

| | | |
|---|---|---|
| DE | 10 2004 041 119 A1 | 3/2006 |
| EP | 2 592 377 A1 | 5/2013 |
| JP | A-2000-329503 | 11/2000 |
| JP | A-2004-101465 | 4/2004 |

OTHER PUBLICATIONS

Extended European Search Report issued in European Application No. 13160967.9 dated Jun. 28, 2013.

* cited by examiner

*Primary Examiner* — G. Bradley Bennett
(74) *Attorney, Agent, or Firm* — Oliff PLC

(57) ABSTRACT

A digital indicator includes: a body; a spindle formed in the body, movably in an axial direction; a displacement detecting sensor configured to detect a movement displacement amount of the spindle; a display device configured to display the movement displacement amount of the spindle detected by the displacement detecting sensor; and a display controller configured to linearly move a measured value display mark representing a measured value in a display surface of the display device according to variations in the measured value.

6 Claims, 9 Drawing Sheets

DIGITAL INDICATOR AND MULTIPOINT MEASURING APPARATUS

CROSS-REFERENCE TO RELATED APPLICATION(S)

This application is based upon and claims the benefit of priority from Japanese Patent Application No. 2012-069379, filed on Mar. 26, 2012, the entire contents of which are incorporated herein by reference.

BACKGROUND

1. Field of the Invention

The present invention relates to a digital indicator and a multipoint measuring apparatus. Specifically, the invention relates to the digital indicator and the multipoint measuring apparatus including a display device for displaying a measured result.

2. Description of the Related Art

In multipoint measurement in which plural measurement points of a measured object are measured simultaneously, an apparatus for installing dial gauges in respective measurement points and grasping a trend of the measured object, for example, a thickness trend or an inclination trend of a measurement surface from readings of these plural dial gauges is used conventionally (for example, see JP-A-2004-101465 and JP-A-2000-329503).

In the case of multipoint measurement using the plural dial gauges, the dial gauges are configured to read a rotational angle position of an indicating needle from a scale formed on a scale plate and make measurement, so that it is difficult to read a trend of a measured object.

For example, when plural dial gauges are installed in predetermined distance positions in an axial direction of a cylindrical measured object and an axial shape of the measured object is measured from readings of these plural dial gauges, rotational angles of indicating needles of the respective dial gauges must be read from scales of scale plates, so that it is difficult to grasp the shape of the measured object at once.

SUMMARY

An object of the invention is to provide a digital indicator and a multipoint measuring apparatus capable of easily grasping a quantitative trend of a shape etc. of a measured object visually.

According to an aspect of the invention, there is provided a digital indicator including: a body; a spindle formed in the body, movably in an axial direction; a displacement detecting sensor configured to detect a movement displacement amount of the spindle; a display device configured to display the movement displacement amount of the spindle detected by the displacement detecting sensor; and a display controller configured to linearly move a measured value display mark representing a measured value in a display surface of the display device according to variations in the measured value.

Here, as the measured value display mark, for example, a bar mark represented by "-", a triangular mark represented by "Δ", a circular mark represented by "•" or a bar-shaped mark can be illustrated. Also, the display device may include, for example, an organic EL panel of a dot-matrix display type in which organic EL (Electro-Luminescence) elements are arranged in a matrix state, an electrophoretic display panel called electronic paper, or a liquid crystal display panel.

According to such a configuration, the measured value display mark representing the measured value is linearly moved in the display surface of the display device according to variations in the measured value, so that a trend of a measurement surface of a measured object can be grasped at once from a movement position of the measured value display mark. Consequently, when the indicators are installed with movement directions of the measured value display marks aligned in the same direction in the display device of each of the indicators in the case of making multipoint measurement using the plural indicators, a measurement surface shape of the measured object can be imaged from positions of the measured value display marks displayed in the display devices of the plural indicators, so that a quantitative trend of a shape etc. of the measured object can easily be grasped visually.

In the digital indicator of the invention, the display controller may linearly move the measured value display mark in a movement direction of the spindle in a display surface of the display device. According to such a configuration, a movement direction of the measured value display mark matches with the movement direction of the spindle, so that a trend of variations in the measurement surface of the measured object can easily be grasped visually.

In the digital indicator of the invention, the display controller may display a tolerance display line representing a tolerance of the measured value along a movement direction of the measured value display mark in a state orthogonal to the movement direction in a display surface of the display device. According to such a configuration, the tolerance display line representing the tolerance of the measured value is displayed along the movement direction of the measured value display mark in the state orthogonal to the movement direction on the display surface of the display device, so that a check whether or not the measured value is a dimension within the tolerance can be made by determining whether or not the measured value display mark is within the range of the tolerance display line. That is, pass/fail determination can be made easily.

In the digital indicator of the invention, the display controller may perform switching to a digital display mode of digitally displaying the measured value and a mark display mode of displaying the measured value display mark and display the display mode according to a switching operation of a display switching unit. According to such a configuration, when the display switching means is switched and operated, switching to the digital display mode of digitally displaying the measured value and the mark display mode of displaying the measured value display mark is performed and the display mode is displayed, so that, for example, switching to the digital display mode can be performed to make measurement in the case of wanting to accurately measure a dimension of a shape etc. of the measured object, and also switching to the mark display mode can be performed to make measurement in the case of wanting to grasp a trend etc. of a shape of the measured object. That is, dimension measurement and trend measurement can be implemented by one indicator by switching the display mode.

In the digital indicator of the invention, the display device may include: an image display part configured to display the measured value display mark; a surface member which is arranged oppositely to this image display part and has a touch surface; and a position detecting part configured to detect a position pressed on the touch surface. According to such a configuration, the display device is constructed of the so-called touch panel including the image display part, the surface member, and the position detecting part, so that an operation switch in a conventional indicator can be displayed on the image display part as an operation object. That is, an operation region for causing a measurer to perform an input operation can be set in the same region as a display region for displaying a measured result etc. Consequently, both of the operation region and the display region can be set widely without upsizing the body of the indicator.

According to another aspect of the invention, there is provided a multipoint measuring apparatus includes: a plurality of digital indicators as described in any of the above; and a holding member configured to hold the plurality of digital indicators in a predetermined relation. According to such a configuration, the plural digital indicators are held by the holding member in the predetermined relation, so that multipoint measurement of the same measurement surface of the measured object can easily be implemented by only installing the holding member in the predetermined relation to the measured object.

BRIEF DESCRIPTION OF THE DRAWINGS

The present invention will become more fully understood from the detailed description given herein below and the accompanying drawing which is given by way of illustration only, and thus is not limitative of the present invention and wherein.

DETAILED DESCRIPTION OF THE INVENTION

Figure 1:
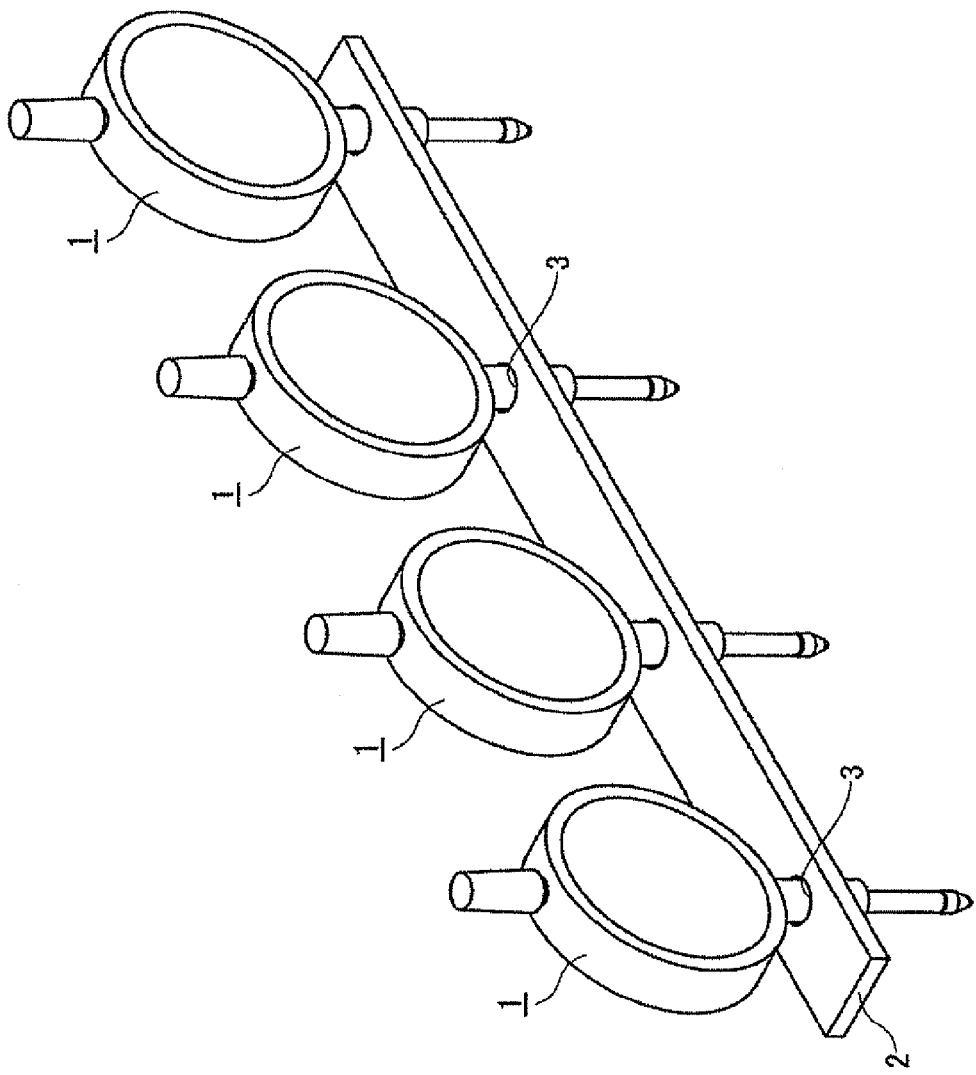
FIG. 1 is a perspective view showing a multipoint measuring apparatus according to an embodiment of the invention.

FIG. 1 shows a multipoint measuring apparatus of the present embodiment. The multipoint measuring apparatus includes plural digital indicators 1 and a holding plate 2 as a holding member for holding these plural digital indicators 1 in the same direction and the same attitude. In addition, the holding plate 2 has an elongated rectangular plate shape, and through holes 3 for holding the digital indicators 1 are formed in predetermined distance positions in a longitudinal direction.

Figure 2:
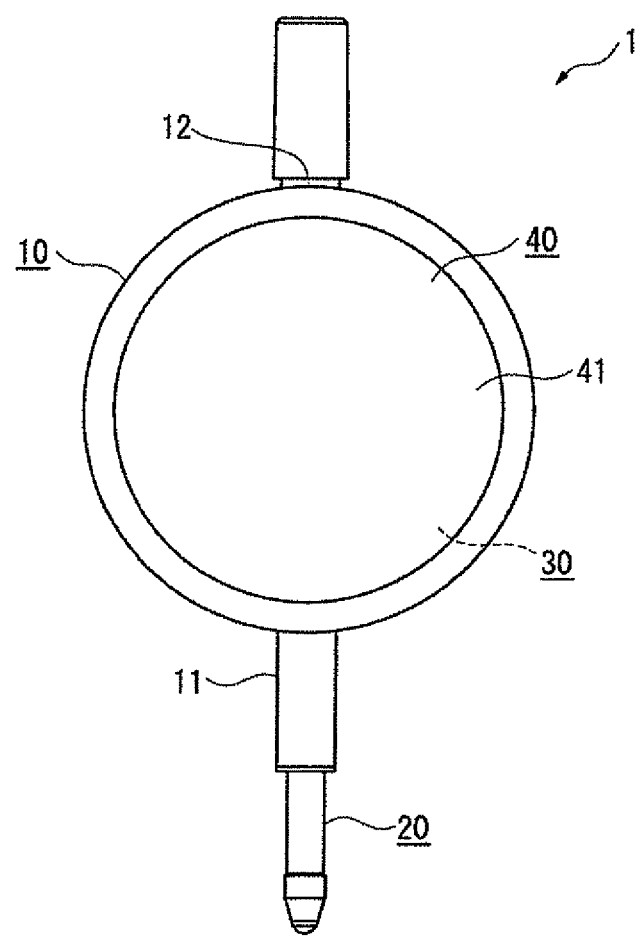
FIG. 2 is a front view showing a digital indicator used in the same embodiment.

FIG. 2 shows the digital indicator 1. The digital indicator 1 includes a cylindrical body 10, a spindle 20 formed in this body 10 movably in an axial direction, a displacement detecting sensor 30 for detecting a movement displacement amount of the spindle 20 in the body 10, and a display device 40 for displaying the movement displacement amount of the spindle 20 detected by this displacement detecting sensor 30. A cylindrical stem 11 and a bushing 12 are oppositely attached to an outer peripheral wall of the body 10, and the spindle 20 is formed movably in the axial direction in a state in which both ends of the spindle 20 are supported between the stem 11 and the bushing 12. The displacement detecting sensor 30 detects a movement displacement amount of the spindle 20, and is constructed of, for example, a capacitance type encoder or a photoelectric encoder. In the display device 40, a circular display surface is formed in the front of the body 10 in parallel with a movement direction of the spindle 20.

Figure 3:
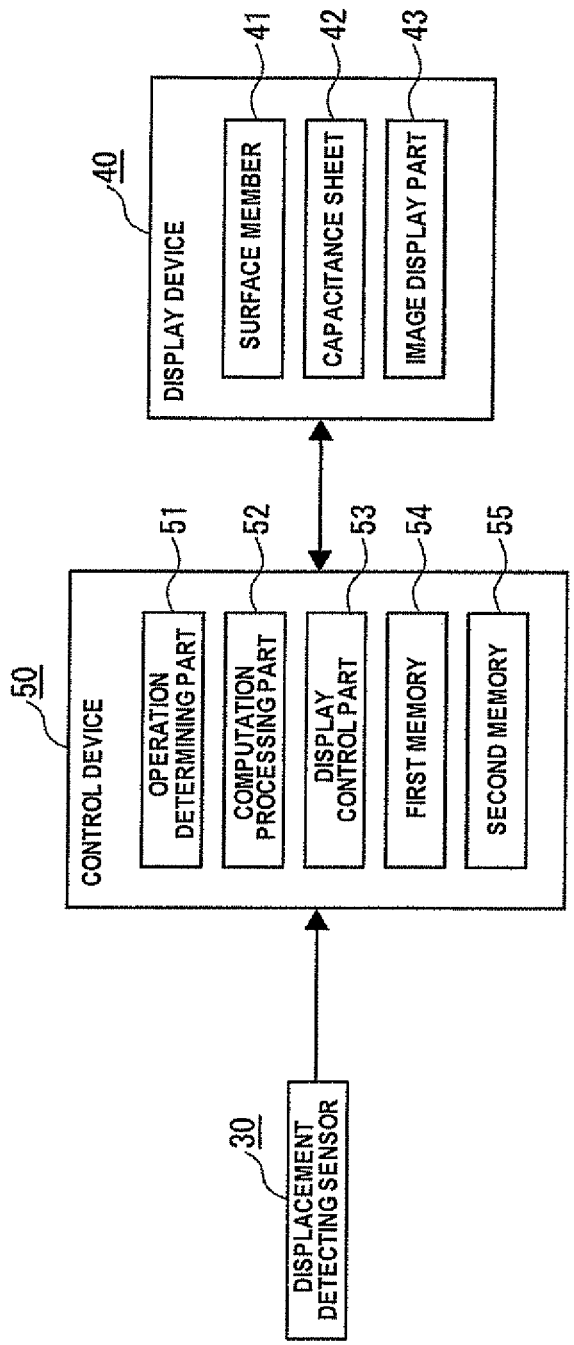
FIG. 3 is a block diagram showing the same digital indicator.

FIG. 3 shows a block diagram of a control device 50 for processing a signal from the display device 40 or the displacement detecting sensor 30. The display device 40 includes a surface member 41, a capacitance sheet 42 as a position detecting part, and an image display part 43. The surface member 41 is a cover glass (film) constructed of a translucent material, and one plate surface (front) is exposed to the outside of the body 10 as a touch surface and is operated by a measurer as shown in FIG. 2. The capacitance sheet 42 (concrete illustration is omitted) is a sheet-shaped member having translucency including an electrode layer and substrate layer equipped with a control IC (Integrated Circuit), and is stuck on the other plate surface (back) of the surface member 41. When the touch surface of the surface member 41 is tapped (pressed), the capacitance sheet 42 forms a capacitor between the capacitance sheet 42 and a finger of a measurer through the surface member 41, and detects that the capacitor is in any position on the touch surface (any position on the touch surface is tapped) as a weak change in capacitance, and outputs a signal about the tapped position to the control device 50. The image display part 43 is constructed of a dot-matrix display panel in which display pixels are arranged in a matrix, and can display characters, graphic forms, etc. Concretely, the image display part 43 can be constructed of, for example, an organic EL panel of a dot-matrix display type, an electrophoretic display panel called electronic paper, or a liquid crystal display panel.

The control device 50 has a CPU etc. and is the portion for controlling the whole of the digital indicator 1, and includes an operation determining part 51, a computation processing part 52, a display control part 53, a first memory part 54, and a second memory part 55. The operation determining part 51 determines an operation of an input to the display device 40 (touch panel) by a measurer based on a signal outputted from the capacitance sheet 42. The computation processing part 52 performs various computation processing based on a measured value stored in the first memory part 54 according to a determined result by the operation determining part 51. The display control part 53 controls an action of the display device 40 (image display part 43). The first memory part 54 stores tolerance dimensions, measured values, etc. obtained from the displacement detecting sensor 30, and also stores computed results etc. by the computation processing part 52. The second memory part 55 stores display image data for display on the image display part 43.

<Display of Measured Result>

Figure 4:
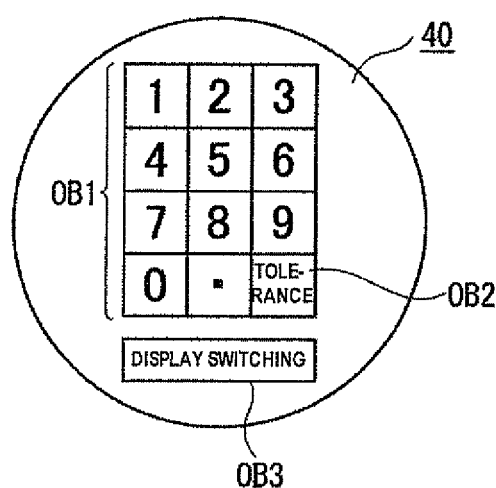
FIG. 4 is a diagram showing a display state at the time of turning on a power source in the same digital indicator.

When a power source is now turned on in the digital indicator 1, a measured value detected by the displacement detecting sensor 30 is captured in the control device 50 and is stored in the first memory part 54. At the same time, an image shown in FIG. 4 is displayed on the image display part 43 of the display device 40. That is, a numerical input object OB1 having, for example, numeric characters such as "1, 2", ..., "9", "0", "•", a tolerance input object OB2 having a character of "tolerance", and a display switching object OB3 as display switching means having a character of "display switching" are displayed as shown in FIG. 4.

When any one of the objects OB1, OB2 and OB3 is tapped herein, the operation determining part 51 recognizes a position (coordinates) tapped on a touch surface based on a signal outputted from the capacitance sheet 42, and recognizes a pixel position in an image corresponding to the tapped position, and compares the pixel position with pixel positions of the objects OB1, OB2 and OB3, and determines whether or not any one of the objects OB1, OB2 and OB3 is tapped.

When the operation determining part 51 determines that any one of the objects OB1, OB2 and OB3 is tapped, the control device 50 executes the following processing. In the case of determining that the object OB1 is tapped, the control device 50 captures inputted numerical information and stores the numerical information in the first memory part 54. In the case of determining that the object OB2 is tapped, the control device 50 stores the numerical information stored in the first memory part 54 as a tolerance dimension. In the case of determining that the object OB3 is tapped, the control device 50 (display control part 53) displays images of FIGS. 5A to 5C on the image display part 43 of the display device 40 according to the number of taps.

Figure 5A:
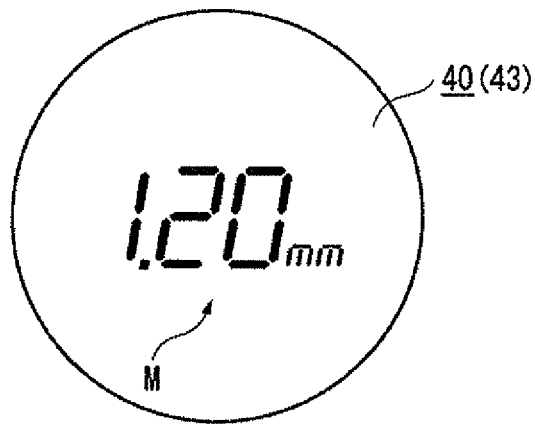
FIGS. 5A to 5C are diagrams showing a state at the time of switching display in the same digital indicator.

First, in the case of determining that the object OB3 is tapped one time, a digital display mode is obtained. Then, the display control part 53 generates image data for display of a measured value detected by the displacement detecting sensor 30 and stored in the first memory part 54, and stores the image data in the second memory part 55, and then displays an image based on the image data for display including its measured value on the image display part 43. That is, a measured value M is digitally displayed as shown in FIG. 5A. Consequently, in the digital display mode, the measured value M detected by the displacement detecting sensor 30 is digitally displayed on the display device 40, so that a dimension etc. of a measured object can be measured with high accuracy.

Figure 5B:
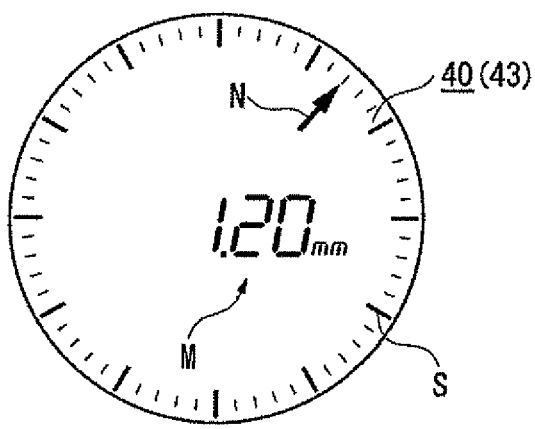

Also, in the case of determining that the object OB3 is tapped two times, a digital-to-analog display mode is obtained. Then, the display control part 53 generates image data for display including a measured value detected by the displacement detecting sensor 30 and stored in the first memory part 54, a scale annularly arranged along the outer periphery of the image display part 43, and an indicating needle corresponding to the measured value, and stores the image data in the second memory part 55, and then displays an image based on the image data for display on the image display part 43. That is, a measured value M, a scale S and an indicating needle N are displayed as shown in FIG. 5B. Consequently, when the display switching object OB3 is switched and operated, the digital-to-analog display mode using digital display and analog display in combination is displayed in addition to the digital display mode of digitally displaying the measured value M, so that a dimension of a measured object can be grasped as analog quantity in addition to a numerical value.

Figure 5C:
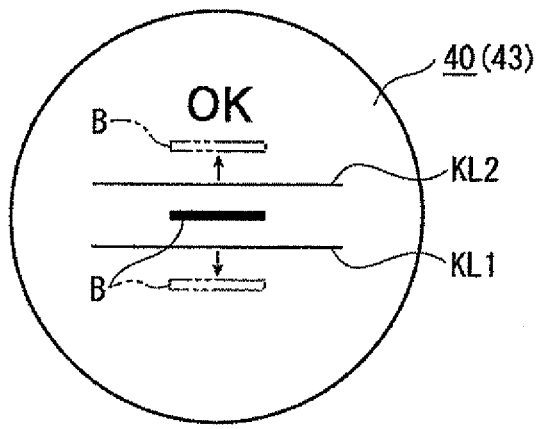

In the case of determining that the object OB3 is tapped three times, a bar display mode is obtained. Then, the display control part 53 generates image data for display of a measured value display bar as a measured value display mark representing a measured value detected by the displacement detecting sensor 30 and stored in the first memory part 54, and stores the image data in the second memory part 55, and then displays an image based on the image data for display on the image display part 43. That is, a measured value display bar B representing the measured value is displayed movably along a movement direction of the spindle 20 (a vertical direction in the embodiment) according to variations in the measured value as shown in FIG. 5C. Consequently, when the display switching object OB3 is tapped, switching to a mark display mode indicating the measured value display bar B is performed and the mark display mode is displayed in addition to the digital display mode and the digital-to-analog display mode.

Figure 6:
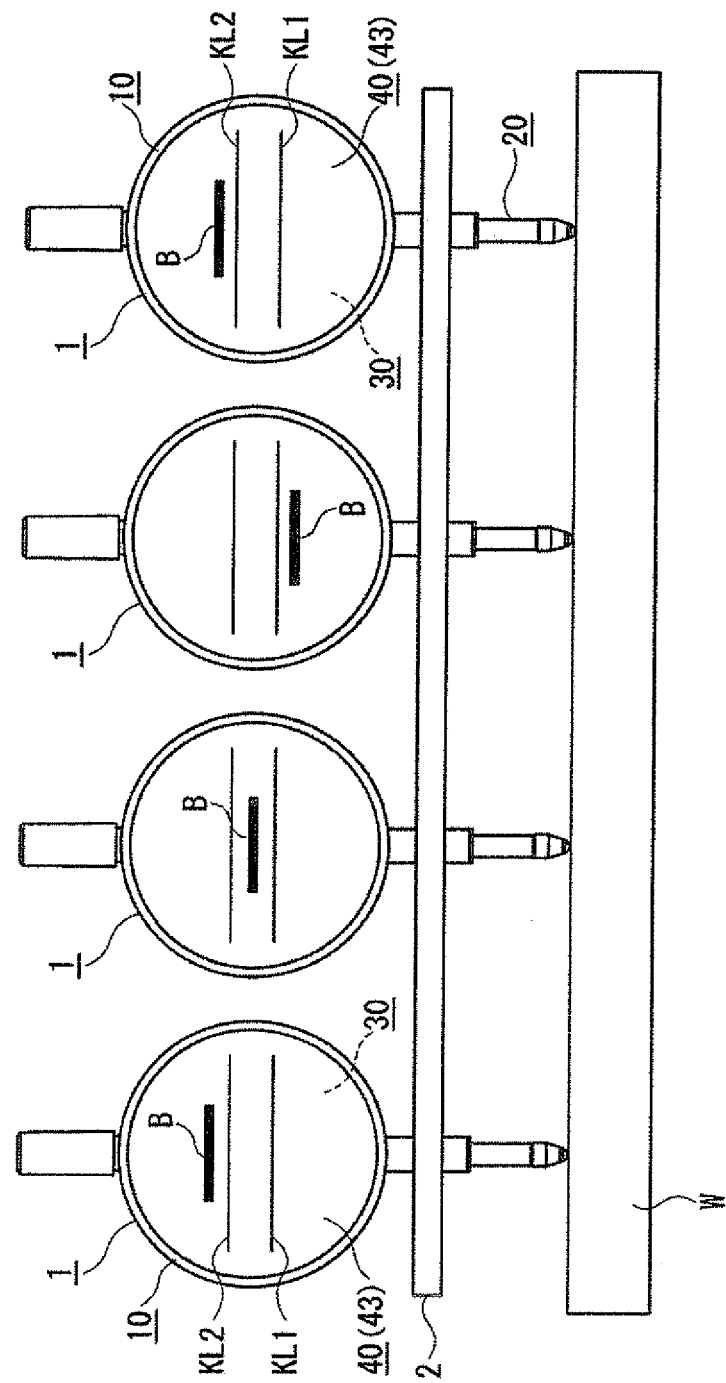
FIG. 6 is a diagram showing a state at the time of multipoint measurement in the same embodiment.

As a result, for example, when the spindles 20 of all the digital indicators 1 are brought into contact with a measurement surface of a measured object W as shown in FIG. 6 in a state in which display modes of all the digital indicators 1 are switched to the bar display modes, positions of the measured value display bars B are moved in movement directions of the spindles 20 according to movement displacement amounts of the spindles 20 at that time. Consequently, a measurement surface shape of the measured object can be imaged from the position of the measured value display bar B displayed in each of the digital indicators 1, so that the measurement surface shape of the measured object can be grasped visually. In addition, in the multipoint measuring apparatus, the plural digital indicators 1 are held by the holding plate 2 in a predetermined relation, so that multipoint measurement of the same measurement surface of the measured object can easily be implemented by only installing the holding plate 2 in a predetermined relation to the measured object.

Also, in the display control part 53, two tolerance display lines KL1, KL2, representing a tolerance of the measured value, are displayed along a movement direction of the measured value display bar B in a display surface of the display device 40 in a state orthogonal to the movement direction based on the numerical information stored in the first memory part 54 as the tolerance dimension as shown in FIG. 5C. Consequently, a check whether or not the measured value M is a dimension within the tolerance can be made by determining whether or not the measured value display bar B is within the range of the two tolerance display lines KL1, KL2. That is, pass/fail determination can be made easily.

Also, the display device 40 is constructed of the so-called touch panel including the surface member 41, the capacitance sheet 42 as the position detecting part, and the image display part 43, so that an operation switch in a conventional indicator can be displayed on the image display part 43 as an operation object. That is, an operation region for causing a measurer to perform an input operation can be set in the same region as a display region for displaying a measured result etc. Consequently, both of the operation region and the display region can be set widely without upsizing the body 10 of the digital indicator 1.

<Modified Example>

Figure 7A:
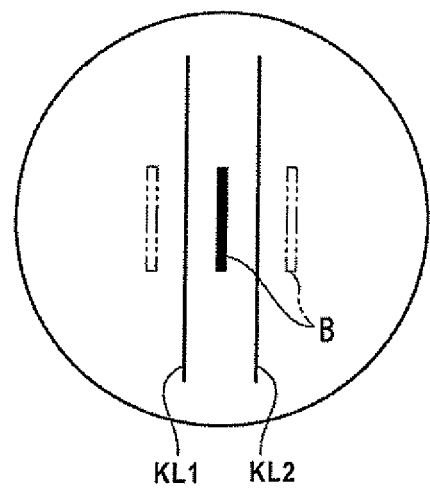
FIGS. 7A and 7B are diagrams showing other examples of a movement direction of a measured value display mark in the same embodiment.
Figure 7B:
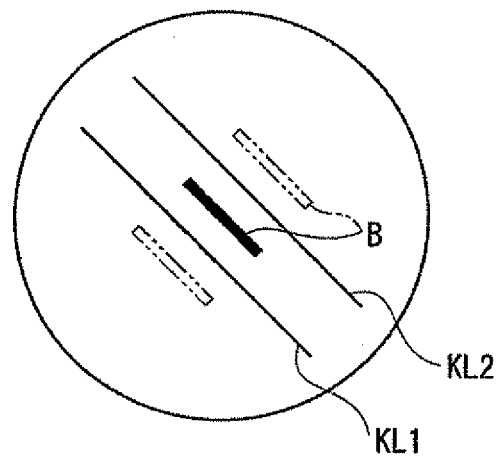

The invention is not limited to the embodiment described above, and the invention includes modifications, improvements, etc., within the scope capable of achieving an object of the invention. In the embodiment, the display control part 53 is constructed so that the measured value display bar B as the measured value display mark representing the measured value is displayed movably along the movement direction of the spindle 20 (the vertical direction in the embodiment) in the bar display mode, but the invention is not limited to this embodiment. For example, as shown in FIGS. 7A and 7B, in a display surface of the display device 40, the measured value display bar B may be displayed movably in a direction orthogonal to the movement direction of the spindle 20 (see FIG. 7A), and also the measured value display bar B may be displayed movably in a direction (an oblique direction) intersecting with the movement direction of the spindle 20 (see FIG. 7B).

Figure 8:
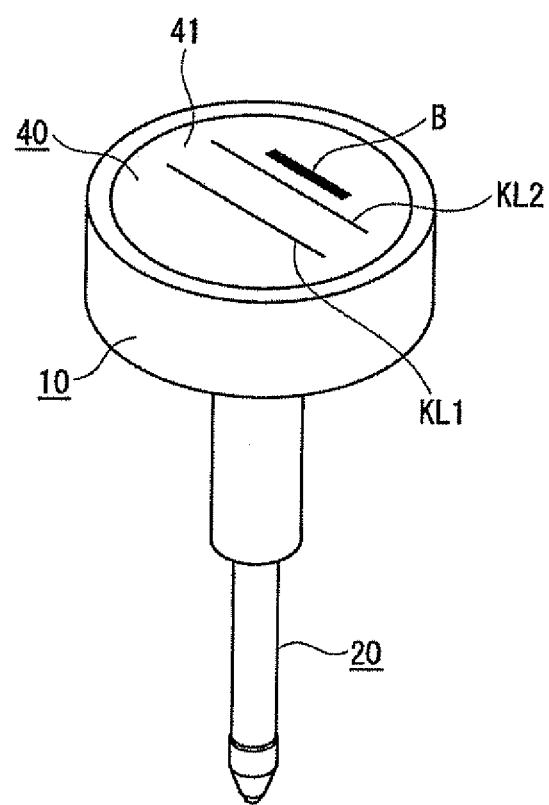
FIG. 8 is a perspective view showing another example of the digital indicator of the invention.

In the embodiment, the display surface of the display device 40 is arranged in the front of the body 10, that is, a surface parallel to the movement direction of the spindle 20, but the invention is not limited to this embodiment and as shown in FIG. 8, the display surface of the display device 40 may be arranged in an upper surface of the body 10, that is, a surface orthogonal to the movement direction of the spindle 20. Accordingly, in the case of installing the spindle 20 in a vertical attitude, the display surface of the display device 40 is turned upward, so that the easy-to-see display surface can be obtained depending on an installation environment of the digital indicator 1.

Figure 9A:
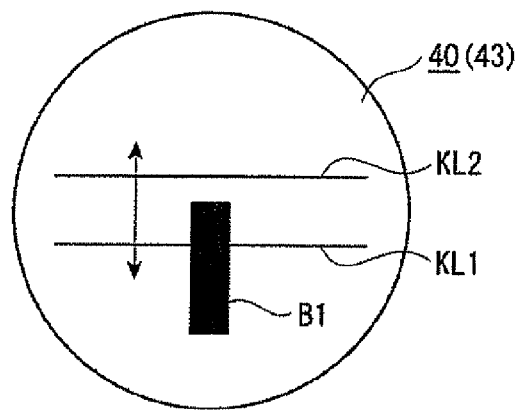
FIGS. 9A to 9C are diagrams showing other examples of the measured value display mark in the digital indicator of the invention.
Figure 9B:
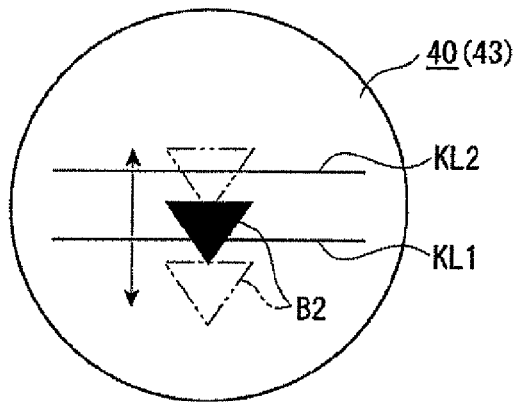
Figure 9C:
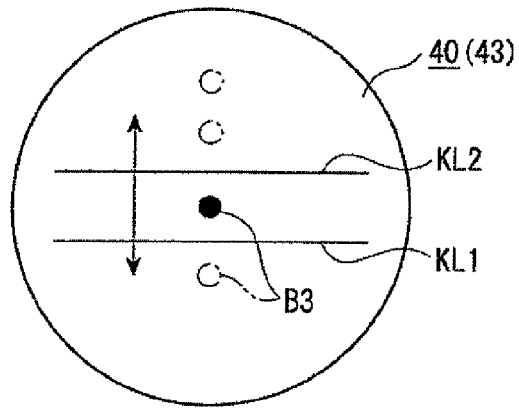

In the embodiment, the measured value display bar B represented by "-" is used as the measured value display mark representing the measured value, but the invention is not limited to this embodiment and, for example, shapes shown in FIGS. 9A to 9C may be used. FIG. 9A is an example of a measured value display mark B1 with a bar graph shape, and FIG. 9B is an example of a measured value display mark B2 with a triangular shape, and FIG. 9C is an example of a measured value display mark B3 with a circular shape. As long as shapes with high visibility are used, the shapes are not limited to the examples described above.

The invention can suitably be used in particularly multipoint measurement etc. in which plural measurement points of a measured object are measured simultaneously.

What is claimed is:

1. A digital indicator comprising:
a body;
a spindle formed in the body, movably in an axial direction;
a displacement detecting sensor configured to detect a movement displacement amount of the spindle;
a display device configured to display the movement displacement amount of the spindle detected by the displacement detecting sensor; and
a display controller configured to linearly move a measured value display mark representing a measured value in a display surface of the display device according to variations in the measured value.

2. The digital indicator according to claim 1, wherein the display controller linearly moves the measured value display mark in a movement direction of the spindle in a display surface of the display device.

3. The digital indicator according to claim 2, wherein the display controller displays a tolerance display line representing a tolerance of the measured value along a movement direction of the measured value display mark in a state orthogonal to the movement direction in a display surface of the display device.

4. The digital indicator according to claim 3, wherein the display controller performs switching to a digital display mode of digitally displaying the measured value and a mark display mode of displaying the measured value display mark and displays the display mode according to a switching operation of a display switching unit.

5. The digital indicator according to claim 1, wherein the display device includes:
an image display part configured to display the measured value display mark;
a surface member which is arranged oppositely to this image display part and has a touch surface; and
a position detecting part configured to detect a position pressed on the touch surface.

6. A multipoint measuring apparatus comprising:
a plurality of digital indicators, each of which including:
a body;
a spindle formed in the body, movably in an axial direction;
a displacement detecting sensor configured to detect a movement displacement amount of the spindle;
a display device configured to display the movement displacement amount of the spindle detected by the displacement detecting sensor; and
a display controller configured to linearly move a measured value display mark representing a measured value in a display surface of the display device according to variations in the measured value; and
a holding member configured to hold the plurality of digital indicators in a predetermined relation.

* * * * *